United States Patent [19]
Vande Berg

[11] Patent Number: 5,498,202
[45] Date of Patent: Mar. 12, 1996

[54] IDENTIFYING SYSTEM FOR CARRIER TROLLEY

[75] Inventor: David M. Vande Berg, Sioux Center, Iowa

[73] Assignee: Vande Berg Scales Co., Sioux Center, Iowa

[21] Appl. No.: 985,963

[22] Filed: Dec. 4, 1992

[51] Int. Cl.⁶ .............................. A22C 18/00; B03B 1/00
[52] U.S. Cl. ................................................................ 452/184
[58] Field of Search ................................... 452/184, 127, 452/181; 283/85; 209/3.3, 922; 250/365

[56] References Cited

U.S. PATENT DOCUMENTS

| | | | |
|---|---|---|---|
| 3,622,000 | 11/1971 | McClenny | 452/184 |
| 3,745,358 | 7/1973 | Firtz et al. | 250/365 |
| 3,858,032 | 12/1974 | Scantlin | 283/85 |
| 4,597,495 | 7/1986 | Knosby | 452/198 |

*Primary Examiner*—Willis Little

[57] ABSTRACT

A system for the continuing identification of carriers of meat carcasses and the like and the carrier involved in the system. The system involves mechano-visible identification of a pattern of uniform sized holes within a matrix on the carrier.

5 Claims, 1 Drawing Sheet

IDENTIFYING SYSTEM FOR CARRIER TROLLEY

BACKGROUND AND SUMMARY OF THE INVENTION

This invention pertains to methods of identification principally of meat carcasses after slaughter of an animal.

Early slaughterers of meat animals bought the animals based on the appearance and weight of the animal. Thus, considerable reliance was placed on the buyer to be a good judge of the grade of meat the animal would produce. Much of the judgement was based on the appearance of the animal together with knowledge of the producer and his methods of raising livestock.

As feed lots have increased in production so that there is less personal attention to each lot of livestock, less reliance can be placed on such knowledge. Therefore, buyers increasingly prefer to buy livestock depending on how each carcass grades and the weight of the carcass after it has been properly trimmed after slaughter. However, such a system of payment requires that each carcass be identified and be kept separate until the weight and grade have been determined.

There are many methods used for maintaining identification. Tags using bar codes or visibly distinguishing marks have been used. Such tags also provide good identification for as long as the tag stays with the carcass. However, there may be frequent separation of the tag from the carcass, causing a total loss of identification. Radio transmitter devices may be attached to the carcass, and then transmitter frequencies can be used to identify the carcass. Any device requiring attachment to the carcass itself presents a risk of contamination of the carcass as well as of disengagement. Electronic devices may also suffer from the bumping and other rough treatment inherent in the process.

By the present invention, each trolley which carries a carcass is coded by means of perforations through a part of the trolley. The perforations are individually patterned for each trolley so that the pattern is machine readable, thus providing a positive identification of that trolley. So long as a carcass and trolley are kept together, the carcass is thus identified. This identification is maintained through the process of grading and weighing until the carcass is ready for shipping or cutting. It will be noted that a trolley may be identified with a particular carcass, or might be used to identify a producer so that the grades and weights may be attributed by the computer to a given producer or seller.

DESCRIPTION

Figure 1:
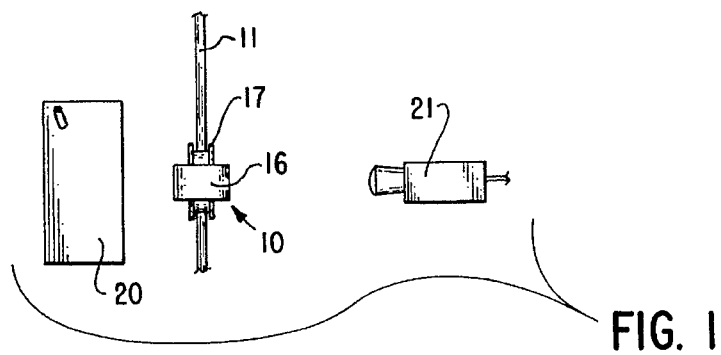
FIG. 1 is a top plan view of the system at one station of identification.
Figure 2:
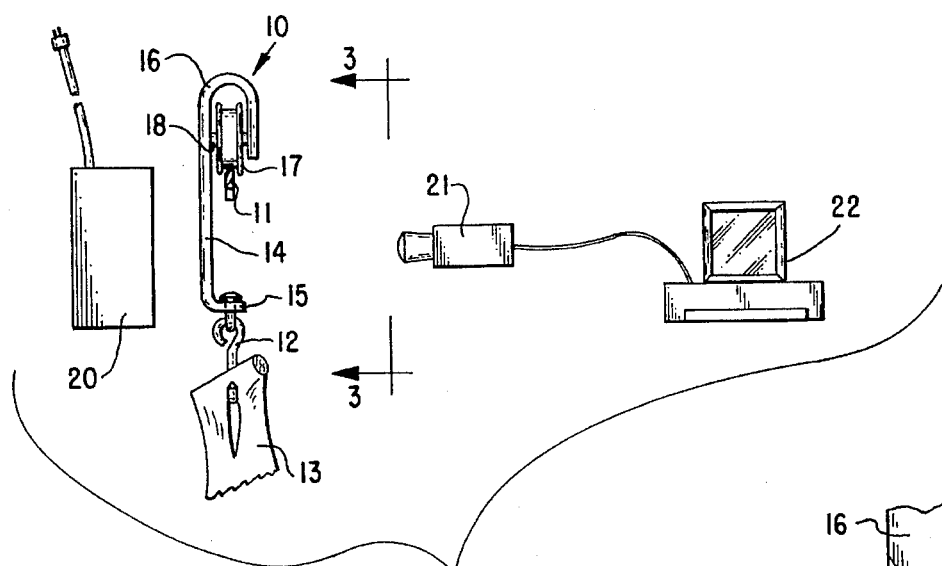
FIG. 2 is an end elevational view of the system of FIG. 1.
Figure 3:
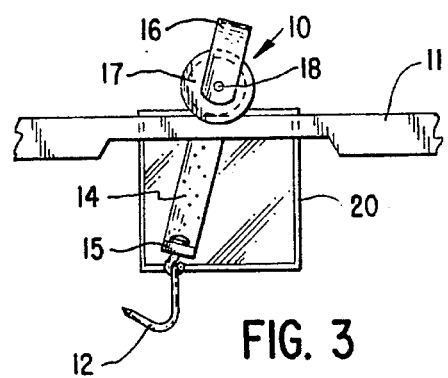
FIG. 3 is an elevational view of the trolley on a rail as seen from line 3—3 of FIG. 2.

Briefly the invention comprises a system of identification using a machine readable pattern of holes in the carrier trolley which is read by a receptor receiving a pattern of lights from a light source transmitted through the holes in the trolley to the receptor where the pattern is translated into an affirmative identification.

More particularly, the device is best used in connection with a trolley 10 running on a track 11. The trolley carries a hook 12 on which a meat carcass 13 may be hung. The trolley consists principally of a strap 14 having a foot 15 in which the hook 12 may be pivotally mounted. At the other end, the strap is bent over to form a U-shaped arch 16 in which a trolley wheel 17 may be journalled on an axle 18. The wheel 17 is grooved so that it will run on the track 11 and follow that track to the various stations.

One of those stations, for example, may be a scale station where the carcass is weighed. At such a station, a light source 20 is located on one side of the track 11 and below it in line with the location of the strap 14 of the trolley 10 as it passes. Opposite the light source is a receptor 21 which is connected electrically to a computer device 22. The software for the computer is designed to sort out varying patterns of light so that each trolley can be identified at any station along the track. As an example, at the weighing station, the trolley can be identified, that identification can be recorded along with the weight which is also transmitted from electronic scales to the computer.

Figure 4:
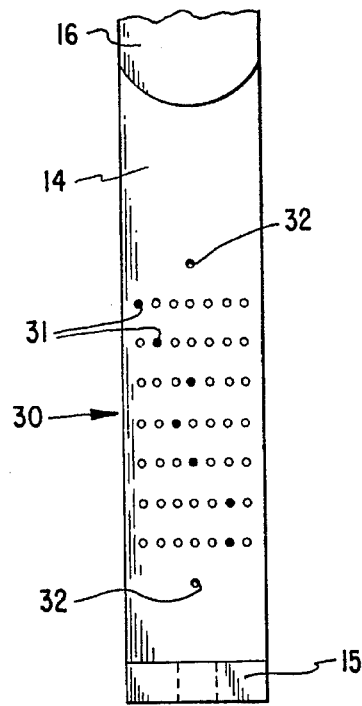
FIG. 4 is a detailed view of the trolley strap showing the grid forming the matrix for the identifier holes.

The identification is preferably formed as a pattern in a matrix of uniformally sized holes. Preferably, this matrix comprises a pattern arranged with seven rows and seven columns. Horizontal lines in the matrix are referred to as rows, and vertical lines as columns. This matrix is shown at 30 in FIG. 4 with locations of potential holes shown as circles. Because of strength considerations, only one hole 31 is allowed in each row although there may be two or more in any one column. A possible pattern of holes is shown by black dots representing actual holes. However, there are obviously a substantial number of combinations of holes available to identify a large number of trolleys. Because of the number of combinations, it is proposed to use holes of uniform size as opposed to some systems which use a size variation to provide the identifying feature.

Because the trolleys often swing laterally on their single wheel 17, the pattern is not always in the same position as the trolley passes the light source 20. Therefore, two orienting holes 32 are provided as the axis of the trolley strap 14. By properly designing the computer software, the identification can still be made positively since the orienting holes can be used to align the pattern electrically and then to read the pattern.

Thus a convenient means and method of positively identifying a trolley or similar carrier running on a track is provided for any application where such identification may be desired at a plurality of positions along the track.

I claim as my invention:

1. A system for providing positive identification of a carrying device comprising a plurality of holes formed in said carrying device to form a matrix of holes, light transmitting means on one side of said carrying device and a receptor on the opposite side of said carrying device whereby light from said transmitting means passing through said holes forms a pattern received by said receptor, said receptor being electrically connected to computer means whereby said pattern is translated to positive identification, said matrix being a rectangular pattern of rows and columns, each of said holes falling on the intersection of one of said rows with one of said columns, at least two additional orientation holes formed in said carrying device and outside of said matrix to provide for electronic orientation of said matrix regardless of the position of said carrying device.

2. The system of claim 1 in which said pattern is formed in a matrix of rows and columns forming a rectangular matrix area, each of said holes falling on the intersection of one of said rows, with one of said columns.

3. The system of claim 1 in which said carrying device is a trolley, track means on which said trolley is adapted to run, said track means extending between varying stations at which identification may be described, and separate transmitting means and receptors at each station.

4. For use in carrying material on a track, trolley means including a strap, at least one wheel adapted to run on said track, said wheels being journalled on axle means attached to said strap, means for carrying said material attached to an end of said strap remote from said axle means, said strap between said wheel and said means for carrying said material being a flat portion, said flat portion being formed with holes in a pattern, said pattern being a matrix of rows and columns, each hole being at the intersection of one of said rows and one of said columns, said pattern thus forming an identifiable arrangement by which each trolley means can be separately identified, at least two orientation holes formed in said flat portion outside of said matrix, said orientation holes being adapted to provide electronic re-orientation of said matrix to allow proper identification regardless of the positioning of said straps.

5. The trolley means of claim 4 in which said holes are of uniform size.

\* \* \* \* \*